(12) United States Patent
Wernersson

(10) Patent No.: US 7,628,554 B2
(45) Date of Patent: Dec. 8, 2009

(54) CAMERA SHUTTER

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 568 days.

(21) Appl. No.: 11/466,257

(22) Filed: Aug. 22, 2006

(65) Prior Publication Data
US 2008/0050112 A1  Feb. 28, 2008

(51) Int. Cl.
G03B 9/08 (2006.01)
G03B 9/10 (2006.01)
G03B 9/20 (2006.01)
H04N 5/238 (2006.01)
G02B 9/08 (2006.01)

(52) U.S. Cl. .................. 396/463; 396/495; 396/501; 348/367; 359/738

(58) Field of Classification Search ............ 396/463, 396/452, 458, 471, 484, 493, 495, 497, 501; 348/363, 367; 359/738, 739
See application file for complete search history.

(56) References Cited

U.S. PATENT DOCUMENTS

| | | | |
|---|---|---|---|
| 3,883,885 A | 5/1975 | Orlando | |
| 4,505,568 A | 3/1985 | Asano et al. | |
| 4,664,493 A | 5/1987 | Takagi | |
| 5,150,702 A | 9/1992 | Miyanaga et al. | |
| 5,459,544 A | 10/1995 | Emura | |
| 6,449,436 B1 | 9/2002 | Fuss | |
| 6,456,786 B1 | 9/2002 | Uchida et al. | |
| 2001/0026687 A1 | 10/2001 | Kosaka et al. | |
| 2005/0146637 A1* | 7/2005 | Kawauchi | 348/363 |

FOREIGN PATENT DOCUMENTS

| | | |
|---|---|---|
| EP | 0 273 394 A2 | 7/1988 |
| JP | 61-144631 | 7/1986 |
| JP | 2-111930 | 4/1990 |
| JP | 10-260507 | 9/1998 |
| JP | 2005-77782 | 3/2005 |

OTHER PUBLICATIONS

PCT Invitation to Pay Additional Fees /Partial International Search Report, PCT/IB2007/050520, Aug. 10, 2007, 7 pages.
XP-002440825, "A series of CCD cameras for low light-level applications", Michal L. Peri et al., SPIE vol. 2654, pp. 188-198.
International Search Report and Written Opinion dated Jul. 11, 2008 issued in corresponding PCT application No. PCT/IB2007/050520, 22 pages.
International Preliminary Report on Patentability mailed Dec. 1, 2008 issued in corresponding PCT application No. PCT/IB2007/050520, 7 pages.

* cited by examiner

Primary Examiner—Rochelle-Ann J Blackman
(74) Attorney, Agent, or Firm—Harrity & Harrity, LLP

(57) ABSTRACT

A camera may comprise a lens assembly to receive optical information from a subject and a shutter assembly comprising a blade, a base plate to pivotally support the blade, and a wire to move the blade in response to a current. The camera may include an image sensor to selectively record optical information passing through the shutter.

16 Claims, 13 Drawing Sheets

CAMERA SHUTTER

BACKGROUND OF THE INVENTION

1. Technical Field of the Invention

Implementations described herein relate generally to lenses, and more particularly to lens shutters.

2. Description of Related Art

Devices, such as mobile communication devices, may perform functions other than communication functions to make these devices more useful to consumers. For example, mobile communication devices may be configured to store and play music and/or video files and/or to record still images or video.

A consumer may find mobile communication devices with image capturing capabilities to be very useful as the consumer does not have to carry a separate camera to record images. Optics used to record images, such as a digital camera lens, may include a shutter to control the amount of light reaching a digital image sensor, such as a charge coupled device (CCD) or complementary metal oxide semiconductor (CMOS) based image sensor that records an image.

Shutters in digital image devices may be implemented as rolling shutters. As a result, all pixels associated with an imaging element may not be available at the same time, e.g., in an opened state when the flash is illuminating a subject being photographed. The sharpness of images captured via flashes in digital image devices may not be of a desired quality since all pixels associated with the imaging element were not available when the flash was turned on. As a result, users of digital image devices may be unsatisfied with images captured using a flash.

BRIEF SUMMARY OF THE INVENTION

According to an aspect, a device is provided. The device may comprise a shutter blade to occlude a an opening to a sensor, and a base plate configured to support an arm, support a wire having a proximal end and a distal end, where the distal end is coupled to the arm and the proximal end is coupled to a post, and pivotally support the shutter blade via a pivot location, where the pivot location allows the shutter blade to move from a first position to a second position to occlude the opening in response to displacement of the arm by the wire.

Additionally, a displacement post coupled to a first end of the shutter blade to cause a second end of the shutter blade to pivot about the pivot location, where the second end pivots toward the light passage in response to displacement of the first end.

Additionally, the wire displaces the arm in response to a current applied to the post.

Additionally, the current is applied to the proximal end of the wire via a pulse width modulated waveform.

Additionally, the wire contracts at a temperature in a range of about 70 degrees centigrade to about 98 degrees centigrade.

Additionally, the flexible arm returns to an initial position when the wire reaches a temperature below about 70 degrees centigrade.

Additionally, the base plate is coupled to ground.

Additionally, the device may further comprise a second shutter blade adapted to move in a direction opposite the direction of movement for a second end of the shutter blade when the shutter blade moves from the first position to the second position.

Additionally, the shutter blade operates as an iris with respect to the opening.

Additionally, the device is used in a lens assembly of a digital camera.

Additionally, the digital camera is implemented in a portion of a mobile communication terminal.

According to another aspect, a device is provided. The device may comprise logic to generate preconditioning pulses adapted to maintain a wire at a temperature below a threshold temperature, where the threshold temperature causes the wire to contract thereby closing a shutter blade used in a lens assembly, generate a closing pulse adapted to raise the temperature of the wire above the threshold temperature to close the shutter blade, and generate maintenance pulses adapted to maintain a state of the wire, where the state comprises a contracted state or a relaxed state. The device may comprise an output interface to provide the preconditioning pulses, the closing pulse, or the maintenance pulses to the wire based on an instruction to operate the shutter blade, where the instruction is related to recording an image via an image sensor in a camera.

Additionally, at least one of the preconditioning pulses, the closing pulse or the maintenance pulses are pulse width modulated pulses.

According another aspect, a camera is provided. The camera may comprise a lens assembly to receive optical information from a subject, and a shutter assembly comprising a blade, a base plate to pivotally support the blade, and a wire to move the blade in response to a current, and an image sensor to record optical information passing through the shutter.

Additionally, the shutter assembly is supported in the lens assembly.

Additionally, the lens assembly and shutter are used in autofocus or manual focus operations.

Additionally, the shutter blade is used as an iris.

According to yet another aspect, an iris assembly is provided. The iris assembly may comprise an iris blade; an arm to manipulate the iris blade in response to a first force or a second force, a base plate pivotally supporting the iris blade and supporting the arm, the base plate having an opening to pass light, and a first wire coupled to the base plate via a proximal end and to the arm via a distal end, where the first wire applies the first force in response to a first input. The camera may further comprise a second wire coupled to the base plate via a proximal end and to the arm via a distal end, where the second wire applies the second force in response to a second input.

Additionally, the first force closes the iris blade with respect to the opening and the second force opens the iris blade with respect to the opening.

According to yet another aspect, a shutter is provided. The shutter may comprise a first shutter blade, a second shutter blade adapted to move in a direction substantially opposite to a direction of movement for the first shutter blade, the first and second shutter blades being configured to maintain optical symmetry with respect to a light passage, a base plate adapted to pivotally support the first shutter blade and the second shutter blade, the base plate including a moveable portion adapted to displace a portion of the first shutter blade and a portion of the second shutter blade in response to a force, a wire supported on a fixed portion of the base plate via a proximal end and supported on the flexible portion via a distal end, where the wire is adapted to contract in response to a current thereby producing the force with respect to the flexible portion, where the force causes the first shutter blade and the second shutter blade to control the size of the light passage.

Additionally, the first shutter blade and the second shutter blade act as an iris with respect to the light passage.

Additionally, the base plate is adapted to fit within an internal dimension of a lens barrel.

According to another aspect, a mobile terminal is provided, the mobile terminal may comprise means for focusing on a subject image with respect to an image sensor using a lens assembly, means for admitting light associated with the subject image to the image sensor through the lens assembly, where the admitting means is supported inside a lens barrel associated with the lens assembly, and means for determining a shutter speed to record the subject image via the image sensor. The mobile terminal may further comprise means for moving a shutter blade from an open position to a closed position using a pulse width modulated current waveform, where the shutter blade prevents the light associated with the subject image from reaching the image sensor when the shutter is in the closed position, and means for returning the shutter to the open position when the image is recorded.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the invention.

Implementations of the invention can be used to improve the quality of images produced using cameras by closing a shutter at determined rates that can be synchronized with other features of the camera, such as a strobe flash. Implementations may include a shutter assembly that fits between lenses of a camera and is small enough in diameter to fit inside a lens barrel supporting the lenses so that the shutter assembly is in the aperture plane of the lens assembly.

The shutter assembly may include a blade and a base having an opening to allow light to pass through to an image capturing device (e.g., a CMOS imager), a CCD device, etc. The blade is pulled over the opening at determined rates using a contactable wire, such as a muscle wire. The wire is contracted by applying a determined current at a determined time. The current heats the wire, and the heating causes the wire to contract. Contraction of the wire is adapted to close the shutter with respect to the opening at a determined rate (e.g., velocity).

Implementations of the shutter can be used to control the amount of light that reaches an imager. For example, the shutter can be adapted to allow the imager to receive light for determined periods, e.g., $\frac{1}{100}^{th}$ of a second, $\frac{1}{25}^{th}$ of a second, etc. Control logic can be used to close the shutter at determined rates.

Exemplary Mobile Terminal

Figure 1A:
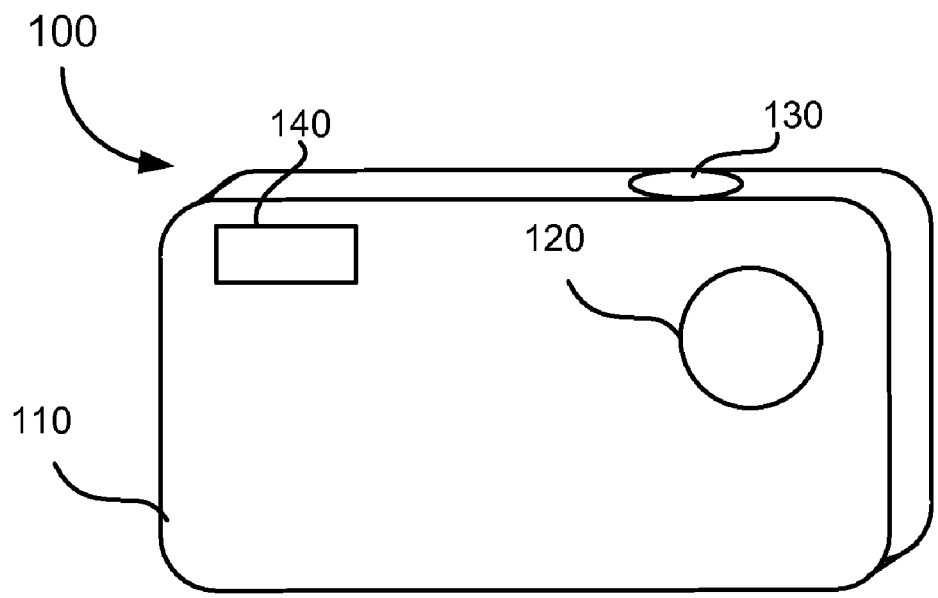
FIGS. 1A and 1B are diagrams of an exemplary implementation of a mobile terminal consistent with principles of the invention.
Figure 1B:
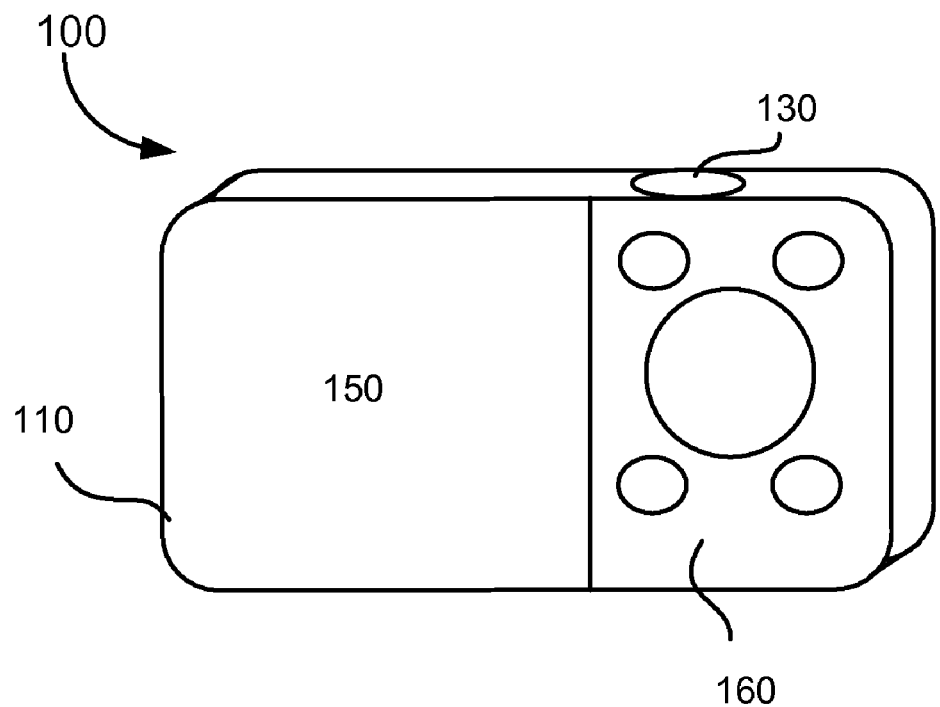

FIGS. 1A and 1B are front side and back side views of an exemplary terminal 100 in which systems and methods consistent with the invention may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Terminal 100 may also include a camera, as described in detail below. It should also be understood that the invention may also be implemented in other devices that include cameras or in a standalone camera that does not include other communication functionality.

Referring to FIG. 1A, mobile terminal 100 (hereinafter terminal 100) may include housing 110, lens assembly 120, shutter button 130, and flash 140. Housing 110 may protect the components of terminal 100 from outside elements. Lens assembly 120 may focus light and may include a number of lens elements. Lens assembly 120 may further include a shutter or iris as further described hereinbelow. Shutter button 130 may be pressed by a user to take a picture.

Flash 140 may include a device to illuminate a subject being photographed. Implementations of flash 140 may be synchronized with a shutter in lens assembly 120 to control an amount of light reaching imaging components in terminal 100. Flash 140 may include light emitting diodes (LED), xenon illumination devices, and/or other types of illumination devices. Flash 140 may further be operated as a strobe-based flash.

FIG. 1B illustrates the back side of terminal 100. Referring to FIG. 1B, terminal 100 includes display screen 150 and user control area 160. Display screen 150 may be a liquid crystal display (LCD) or some other type of display screen that allows the user to view images that will be captured when the user takes a picture.

User control area 160 may include controls associated with placing telephone calls via terminal 100. For example, user control area 160 may include a dial button, hang up button, etc. User control area 160 may also include a menu button that permits the user to view a menu associated with selecting functions, such as a camera function for terminal 100.

Exemplary Functional Diagram

Figure 2:
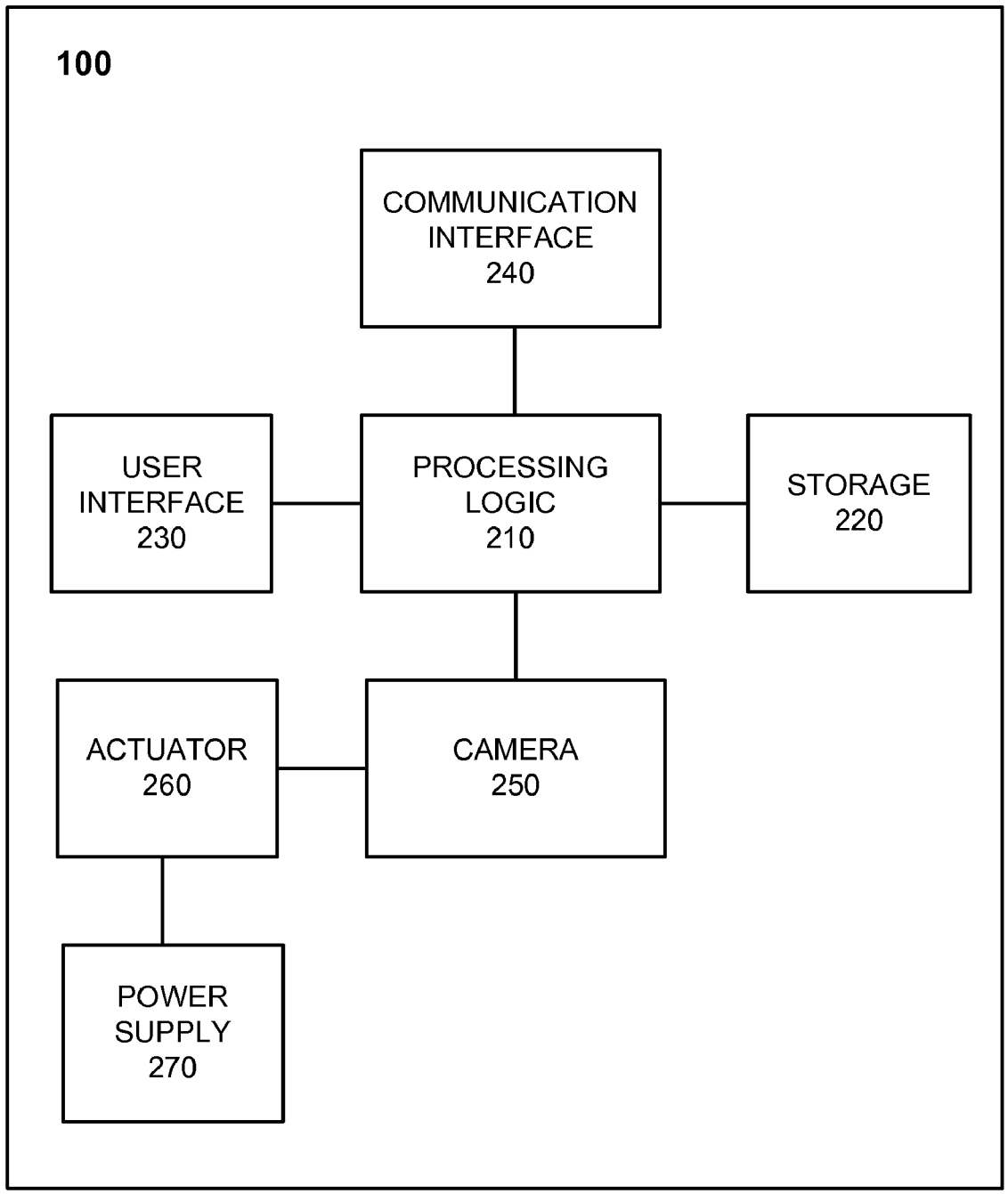
FIG. 2 illustrates an exemplary functional diagram of a mobile terminal consistent with principles of the invention.

FIG. 2 illustrates an exemplary functional diagram of terminal 100. As shown in FIG. 2, terminal 100 may include processing logic 210, storage 220, a user interface 230, a communication interface 240, a camera 250, an actuator 260 and a power supply 270. Processing logic 210 may include a processor, microprocessor, an application specific integrated circuit (ASIC), field programmable gate array (FPGA), or the like. Processing logic 210 may include data structures or software programs to control operation of terminal 100 and its components, such as camera 250. Storage 220 may include a random access memory (RAM), a read only memory (ROM), a magnetic or optical disk and its corresponding drive and/or another type of memory to store data and instructions that may be used by processing logic 210.

User interface 230 may include mechanisms for inputting information to terminal 100 and/or for outputting information from terminal 100. Examples of input and output mechanisms may include a speaker to receive electrical signals and output audio signals, a microphone to receive audio signals and output electrical signals, buttons to permit data and control commands to be input into terminal 100, a display to output visual information, and/or a vibrator to cause terminal 100 to vibrate.

Communication interface 240 may include, for example, an antenna, a transmitter that may convert baseband signals from processing logic 210 to radio frequency (RF) signals and/or a receiver that may convert RF signals from the antenna to baseband signals. Alternatively, communication interface 240 may include a transceiver that performs the functions of both a transmitter and a receiver.

Camera 250 may include hardware and software based logic to create still or moving images using terminal 100. In one implementation, camera 250 may include solid-state image capturing components, such as charge coupled devices (CCDs) or CMOS devices. In other implementations, camera 250 may include non-solid state devices, such as devices used to record images onto film. Camera 250 may include a lens assembly, a shutter, an iris, and/or other devices to record image data received from a subject.

Actuator 260 may include a device to move a shutter or iris associated with camera 250. In one implementation, actuator 260 may include one or more wires that are configured to contract as they are heated via a current. The wires may be used to manipulate a shutter or iris operating in lens assembly 120.

Power supply 270 may include a device to provide power to actuator 260 and/or other devices operating in terminal 100. For example, power supply 270 may include a device to provide a current to an end of a muscle wire that acts as an actuator to displace a shutter blade. Power supply 270 may include self-contained power sources, such as batteries, or may provide power via an external source, such as a wall outlet or external battery pack.

Implementations of power supply 270 may provide a direct current (DC) and/or alternating current (AC) signal to actuator 260. Power supply 270 may be configured to provide current waveforms, such as pulse width modulated (PWM) waveforms, to actuator 270.

As will be described in detail below, terminal 100, consistent with principles of the invention, may perform certain operations relating to manipulating a shutter or iris in lens assembly 120. Terminal 100 may perform these operations in response to processing logic 210 executing software instructions of a shutter displacement application contained in a computer-readable medium, such as storage 220. A computer-readable medium may be defined as a physical or logical memory device and/or carrier wave.

The software instructions may be read into storage 220 from another computer-readable medium or from another device via communication interface 240. The software instructions contained in storage 220 may cause processing logic 210 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Lens Assembly

Figure 3:
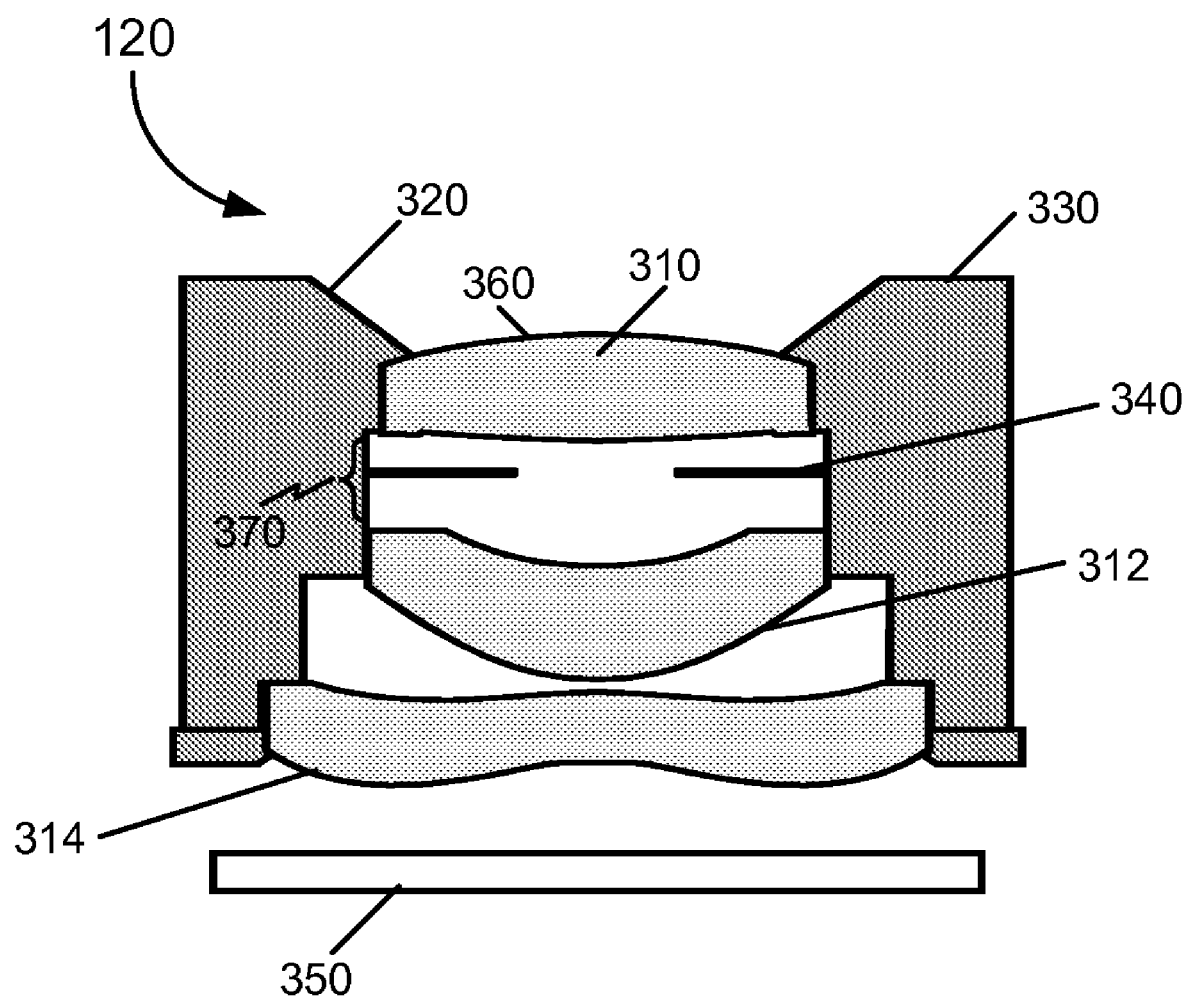
FIG. 3 illustrates an exemplary lens assembly employing a shutter consistent with principles of the invention.

FIG. 3 illustrates an exemplary lens assembly 120 employing a shutter. Lens assembly 120 may include a first lens 310, a second lens 312, a third lens 314, a first lens barrel 320, a second lens barrel 330, an aperture assembly 340, and an image sensor 350. Other implementations of lens assembly 120 may include more components, fewer components, components in an alternative arrangement as compared to the arrangement of FIG. 3, and/or may include components in alternative orientations (e.g., lens barrels 320/330 may be located above and/or below lenses 310, 312, 314).

First lens 310, second lens 312, and third lens 314 (collectively lenses 310) may include optical elements adapted to focus an incoming optical signal (e.g., light reflected from a subject being photographed) onto image sensor 350. Lenses 310 may be adapted to operate together to focus the optical signal on image sensor 350. In one implementation, lenses 310 may move with respect to each other when performing focusing operations. Lenses 310 may be made of optical quality glass, plastic, or other material.

First lens barrel 320 and second lens barrel 330 (collectively lens barrel 320) may include structures adapted to support one or more lenses 310. In one implementation, two lens barrel portions may be used, such as first lens barrel 320 and second lens barrel 330 and in another implementation, a single lens barrel may be used, where the single lens barrel substantially surrounds lenses 310 and aperture assembly 340. Still other implementations may use other configurations of lens barrels. Lens barrel 320 may be made of metal, plastic, glass, composite, and/or other material that can support one or more lenses 310 and/or aperture assembly 340 in determined positions. An inner surface of lens barrel 320 may be contoured to support lenses 310 and/or aperture assembly 340.

Aperture assembly 340 may include a device that controls an amount of light passing from an outer surface 360 of lens 310 to image sensor 350. Aperture assembly 340 may include multiple components adapted to allow or prevent light from reaching image sensor 350. Aperture assembly 340 may be sized to fit inside lens barrel 320 and may have a height less than or equal to dimension 370. Aperture assembly 340 may include one or more contraction devices, such as wires, to cause aperture assembly 340 to allow or prevent light from reaching image sensor 350.

Image sensor 350 may include a device to record optical information received via lenses 310. Image sensor 350 may include solid-state devices that record optical intensities related to incoming light. Image sensor 350 may include a surface area that is divided into units, such as pixels. Image sensor 350 may turn pixels on/off individually or as a group and/or may store information from pixels individually or as a group.

Exemplary Base Plate

Figure 4:
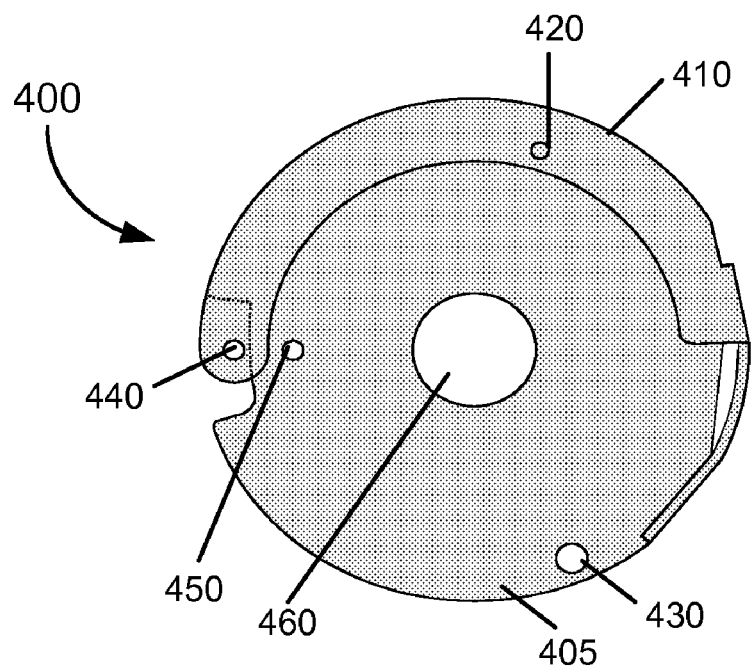
FIG. 4 illustrates a base plate consistent with principles of the invention.

FIG. 4 illustrates a base plate 400. Base plate 400 may include a device to support a shutter blade and/or other structure that can be used to occlude a light passage, such as an opening in base plate 400. Base plate 400 may be sized to fit inside lens barrel 320 and may be supported by an inner surface thereof. Base plate 400 may be made of metal, plastic, composite, and/or other material that can support one or more shutter blades. In one implementation, base plate 400 may be made from electrically conductive material. Electrically conductive implementations of base plate 400 may be connected to ground and/or to another potential, such as a positive or negative voltage with respect to ground. The implementation of base plate 400 illustrated in FIG. 4 may be adapted for monostable implementations that employ a single shutter blade. Other implementations may be adapted for use in other applications, such as applications requiring a bistable implementation, i.e., one that uses two shutter blades, and/or applications that use more than two shutter blades.

In one implementation, base plate 400 may be on the order of 5 millimeters (mm) to 10 mm in diameter, and in a preferred implementation, base plate 400 may have a diameter on the order of 7-8 mm. Base plate 400 may be dimensioned to be light weight so that base plate 400 may be used in autofocus lens configurations. For example, lens barrel 320 may be adapted to move toward and away from image sensor 350 in autofocus implementations. Base plate 400 may be light enough so as not to impair movement of lens barrel 320.

Base plate 400 may include lower surface 405, flexible arm 410, terminator 420, post channel 430, displacement channel 440, shutter pivot channel 450, and opening 460. Lower surface 405 may be substantially flat and may include opening 460 to allow light to pass therethrough, e.g., to allow incident light to pass from upper surface 360 to image sensor 350. Opening 460 may act as a light passage and may vary in size, shape, and location on lower surface 405 depending on the types of applications and/or lenses in which base plate 400 will be used. Lower surface 405 may further support flexible arm 410 along an outer edge of lower surface 405 so as to maintain a narrow thickness along an inner portions of lower surface 405, such as a portion proximate to opening 460.

Flexible arm 410 may be moveably supported on lower surface 405 in a manner whereby portions of flexible arm 410 can be displaced via displacement devices, such as muscle wires, struts, arms, etc. Flexible arm 410 may be made from the same material as lower surface 405 or a different material depending on desired flexing characteristics of flexible arm 410. Flexible arm 410 may return to an initial position once force used to displace flexible arm 410 is removed therefrom. Flexible arm 410 may include terminal 420 for receiving an end of a displacement device, such as a muscle wire.

Post channel 430 may include an opening adapted to receive a post, such as an insulating post, used to support a displacement device, such as a muscle wire. Displacement channel 440 may include an opening passing through lower surface 405 and adapted to receive a member, such as a post, that can be used to displace an object, such as a portion of a shutter blade.

Shutter pivot channel 450 may include an opening adapted to receive a post that allows a portion of a shutter blade to pivot about the post and/or shutter pivot channel 450.

Exemplary Shutter Blade

Figure 5:
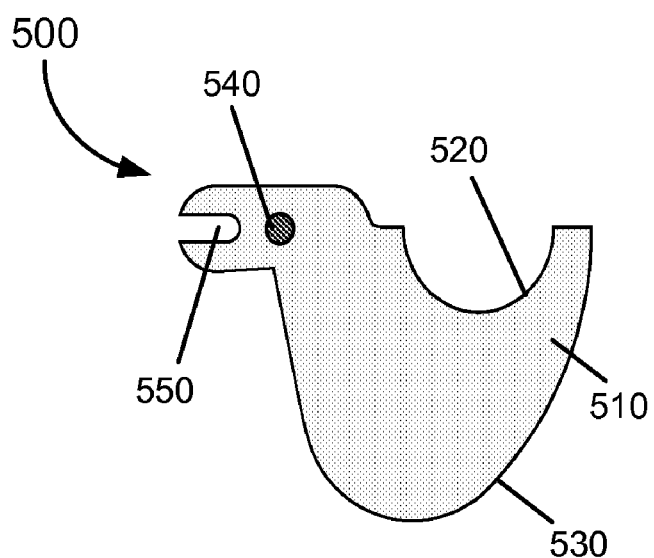
FIG. 5 illustrates a shutter blade consistent with principles of the invention.

FIG. 5 illustrates a shutter blade 500. Shutter blade 500 may include a device adapted to move with respect to base plate 400 to occlude opening 460. Shutter blade 500 may be moveably supported on lower surface 405 and may move parallel to a surface of base plate 400. Shutter blade 500 may be made of metal, plastic, and/or other material. A size and/or shape of shutter blade 500 may be adapted to achieve a determined displacement speed of shutter blade 500 with respect to opening 460.

Shutter blade 500 may include a body 510, an inner surface 520, an outer surface 530, a shutter pivot post 540, and a notch 550. Body 510 may be substantially flat and may be made of a material that is opaque with respect to light so that body 510 prevents light from passing through opening 460 when body 510 is positioned between a light source and opening 460.

Inner surface 520 may include a surface of shutter blade 500 that passes over opening 460 when shutter blade 500 is displaced with respect to base plate 400. Outer surface 530 may include a surface of shutter blade 500 that faces an outer edge of base plate 400. Outer surface 530 may be shaped to follow a contour of an outer edge of base plate 400 or an inner surface of lens barrel 320.

Shutter pivot post 540 may include a device that passes through shutter pivot channel 450 and maintains shutter blade 500 in a determined position with respect to lower surface 405 of base plate 400. Shutter pivot post 540 may be adapted to rotate within shutter pivot channel 450 to allow shutter blade 500 to cover and reveal opening 460. Notch 550 may include a channel adapted to engage a post related to displacement channel 440. Notch 550 may be used to displace a portion of shutter blade 500 to cause another portion of shutter blade 500 to pivot about shutter pivot post 540.

Exemplary Assembly

Figure 6:
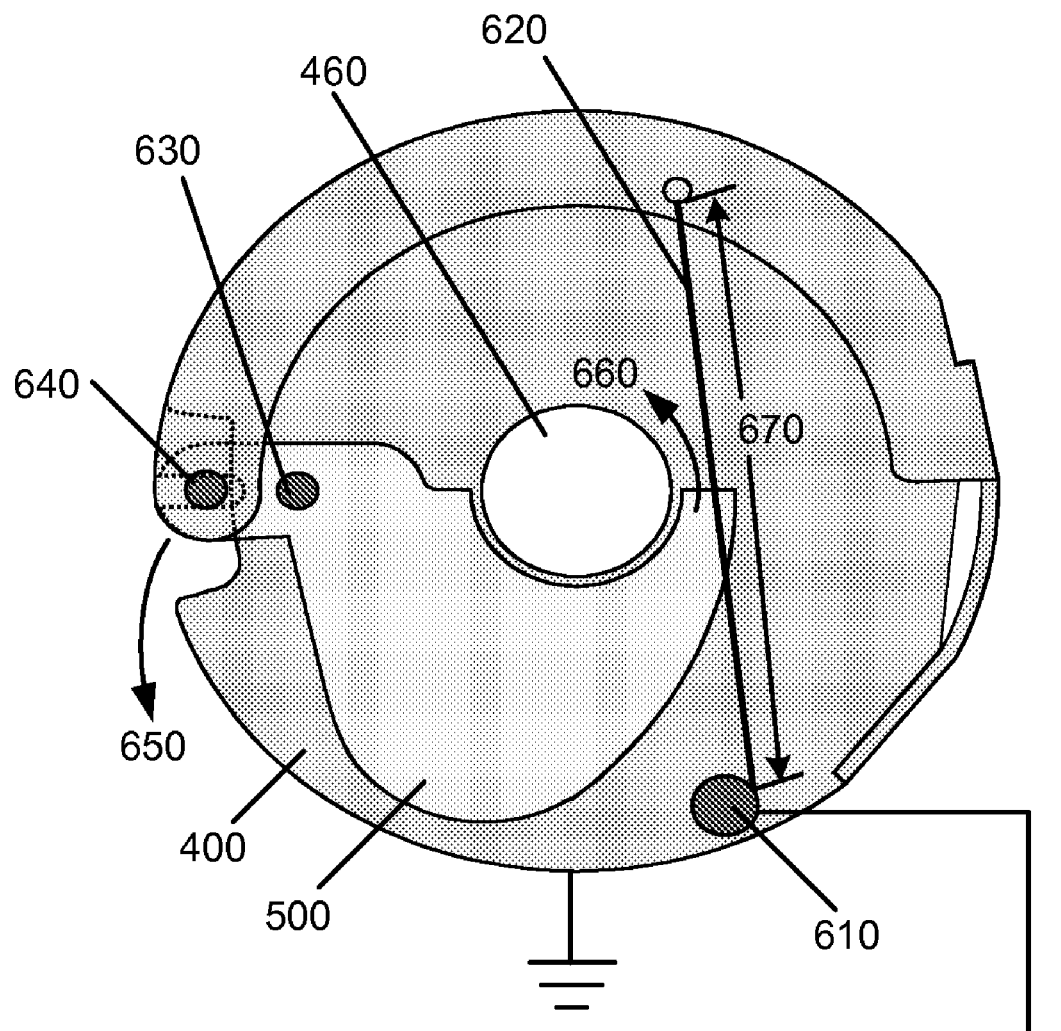
FIG. 6 illustrates an assembly that includes the base plate of FIG. 4 and the shutter blade of FIG. 5 consistent with principles of the invention.

FIG. 6 illustrates aperture assembly 340 that includes base plate 400 and shutter blade 500. Aperture assembly 340 may include power supply 270, base plate 400, shutter blade 500, insulated post 610, wire 620, pivot location 630, and displacement post 64. Displacement directions 650 660 are illustrated and described in detail below.

Insulated post 610 may include a structure to support an end of wire 620, such as a proximate end. Insulated post 610 may further insulate the proximate wire end from base plate 400. Insulated post 610 may be connected to power supply 270 and may receive a current therefrom for use by wire 620.

Wire 620 may include a device or structure that is electrically conductive. In one implementation, wire 620 may be fabricated from material that changes shape when a voltage and/or current is applied thereto. For example, wire 620 may be fabricated from memory shape alloys that change shape and/or other properties as a function of one or more parameters, such as temperature.

In one implementation, wire 620 may be configured to contract (i.e., a fixed length becomes shorter) when wire 620 is heated beyond a threshold temperature. Implementations of wire 620 may include alloys that have poor conductivity (e.g., alloys that have resistive characteristics) to precipitate heating of wire 620 to obtain desired characteristics, such as a change in length, when a current is applied thereto.

Implementations of wires suitable for use as wire 620 may include memory shape alloys made from nickel and titanium that may be known as "muscle wire" to those skilled in the relevant arts (e.g., trade names of Nitinol and Flexinol). Implementations that use muscle wire may contract on the order of 3% to 5% when heated beyond a threshold temperature. For example, an implementation, such as the implementation of FIG. 6, may use muscle wire for wire 620 that contracts at temperatures on the order of 70 to 98 degrees centigrade and that relaxes (i.e., returns to the pre-heated state) at temperatures on the order of 50 to 68 degrees centigrade.

In one implementation, wire 620 may be configured to exert sufficient force on flexible arm 410 to displace flexible arm 410 toward insulated post 610. Displacing flexible arm 410 may cause displacement post 640 to be displaced in displacement direction 650. Displacement in direction 650 may cause another portion of shutter blade 500 to be displaced in a direction substantially opposite to direction 650. For example, inner surface 520 may be displaced in direction 660 in response to displacement in direction 650.

Wire 620 can be used in lengths, such as length 670, that allow flexible arm 410 to be displaced by determined amounts. For example, wire 620 can be cut to a size that displaces flexible arm 410 from a first position with wire 620 in a relaxed state (e.g., the state shown in FIG. 6 where wire 620 has length 670) to a second position with wire 620 in a contracted state. An amount of electrical power required to cause a desired displacement of flexible arm 410 can be determined based on a desired degree of heating of wire 620, the heat capacity of wire 620, and the resistance of wire 620.

Implementations of wire 620 can be driven with steady state currents or variable currents. For example, in one implementation, wire 620 may be driven with a waveform, such as a pulse width modulated (PWM) waveform. Waveforms, such as PWM, can be selected to provide desired amounts of heating to wire 620, to allow determined amounts of cooling of wire 620, to provide power control for causing rapid movement of shutter blade 500, and to control current flow through wire 620.

Pivot location 630 may include a location and/or supporting structures about which shutter blade 500 pivots when moving from a first position (e.g., an open position where light passes through opening 460) to a second position (e.g., a closed position where light is prevented from passing through opening 460).

Displacement post 640 may include a device to engage notch 550 to displace a portion of shutter blade 500 proximate to notch 550. For example, displacement post 640 may displace notch 550 in direction 650 to cause inner surface 520 to be displaced in direction 660.

Figure 7:
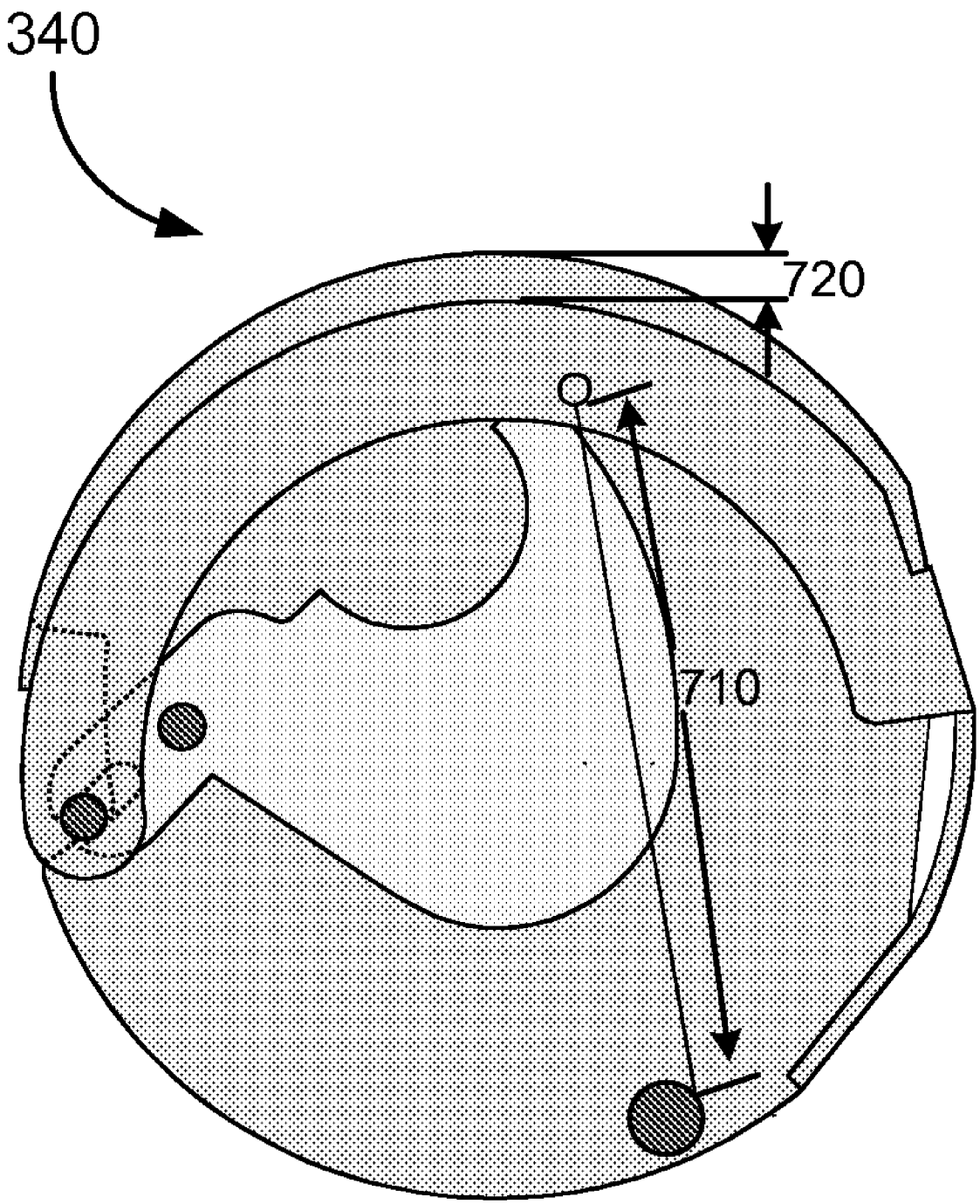
FIG. 7 illustrates the assembly of FIG. 6 with the shutter blade in a closed position consistent with principles of the invention.

FIG. 7 illustrates aperture assembly 340, of FIG. 6, with shutter blade 500 in a closed position. In FIG. 7, wire 620 has contracted to length 710, which may be a determined length with respect to length 670. Contraction of wire 620 may cause a portion of flexible arm 410 to be displaced a distance 720. In one implementation, distance 710 may be the same as distance 720 and in another implementation distance 710 and 720 may be different. In each case, contraction of wire 620 may exert forces on shutter blade 500 and may cause shutter blade 500 to move in the desired direction. Flexible arm 410 may return to an initial position as wire 620 cools, i.e., approaches a temperature below a threshold temperature for contraction.

Exemplary Actuation Waveforms

Figure 8:
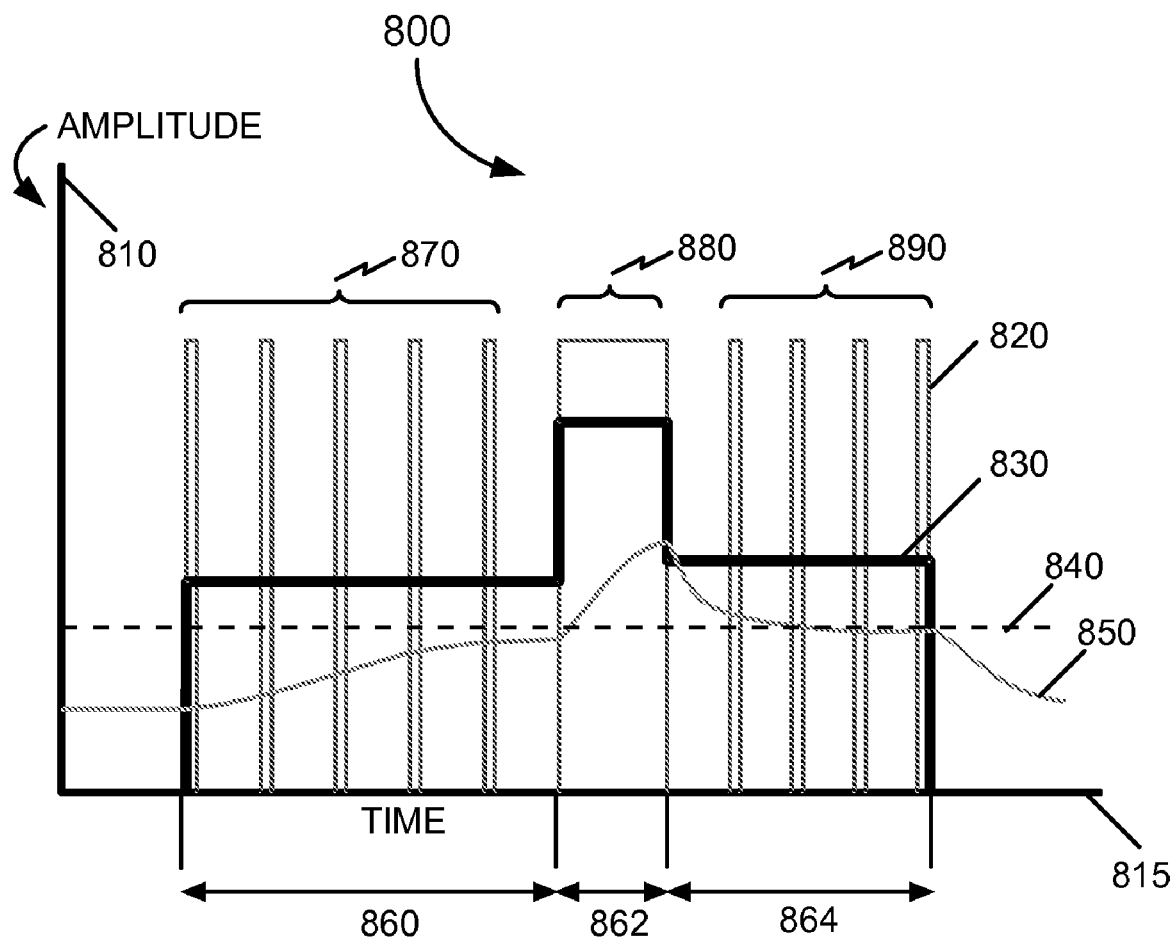
FIG. 8 illustrates pulse timings that can be used to actuate a shutter consistent with principles of the invention.

FIG. 8 illustrates pulse timings that can be used to actuate shutter blade 500. In plot 800, amplitude axis 810 may represent amplitudes for one or more waveforms, such as current waveforms. Amplitude axis 810 may represent values in milliamps, amps, watts, etc. Time axis 815 may represent time for information displayed in plot 800. Time axis 815 may represent values in terms of milliseconds, seconds, minutes, etc.

Applied current 820 may represent information related to a current that is applied to wire 620 via power supply 270. Applied current 820 may be a waveform, such as a PWM waveform, and/or may be steady state. Average current 830 may represent an average current value as a function of time in plot 800. For example, power supply 270 may supply a PWM current waveform to wire 620. Power supply 270 may vary pulse spacings and/or pulse amplitudes depending on system characteristics, such as how fast and/or how far shutter blade 500 should move. Average current 830 may represent average values for applied PWM current waveforms over determined time intervals.

Temperature 840 may represent an ambient temperature value inside camera 250. Temperature 840 may be used to determine a threshold, such as a threshold for a relaxed state of wire 620. Temperature 840 may change depending on an environment in which camera 250 is operated. Temperature 840 may be obtained via a temperature sensor operating in camera 250.

Wire temperature 850 may represent a temperature of wire 620 at determined times. For example, wire 620 may be at an initial temperature with respect to temperature 840, such as at temperature 840, above temperature 840 or below temperature 840. Wire temperature 850 may change as applied current 820 is applied to wire 620. For example, wire temperature 850 may gradually change during interval 860, such as by increasing to a point just below a contraction temperature for wire 620. Wire temperature 850 may change at a faster rate during interval 862 so as to cause wire 620 to contract so that shutter blade 500 is moved into a closed position with respect to opening 460 at a determined rate, e.g., velocity. Wire temperature 850 may be maintained at a substantially constant temperature during interval 864, such as a temperature that maintains wire 620 in a contracted state. Wire temperature 850 may be allowed to decrease after interval 864 so that wire 620 returns to a relaxed state, e.g., length 670 (FIG. 6).

Applied current 820 may be provided individually or in pulse groupings designed to achieve certain aspects of shutter blade 500 displacement. For example, a first pulse or grouping of applied current 820 pulses may form preconditioning pulses 870 that cause wire 620 to heat to a point just below where contraction may begin. A second pulse or grouping of applied current 820 pulses may form closing pulse 880 that may cause wire 620 to contract. A third pulse or grouping of pulses may form maintenance pulses 890 that maintain wire 620 in a determined state, such as a contracted state.

Exemplary Dual Shutter Blade Implementation

Figure 9:
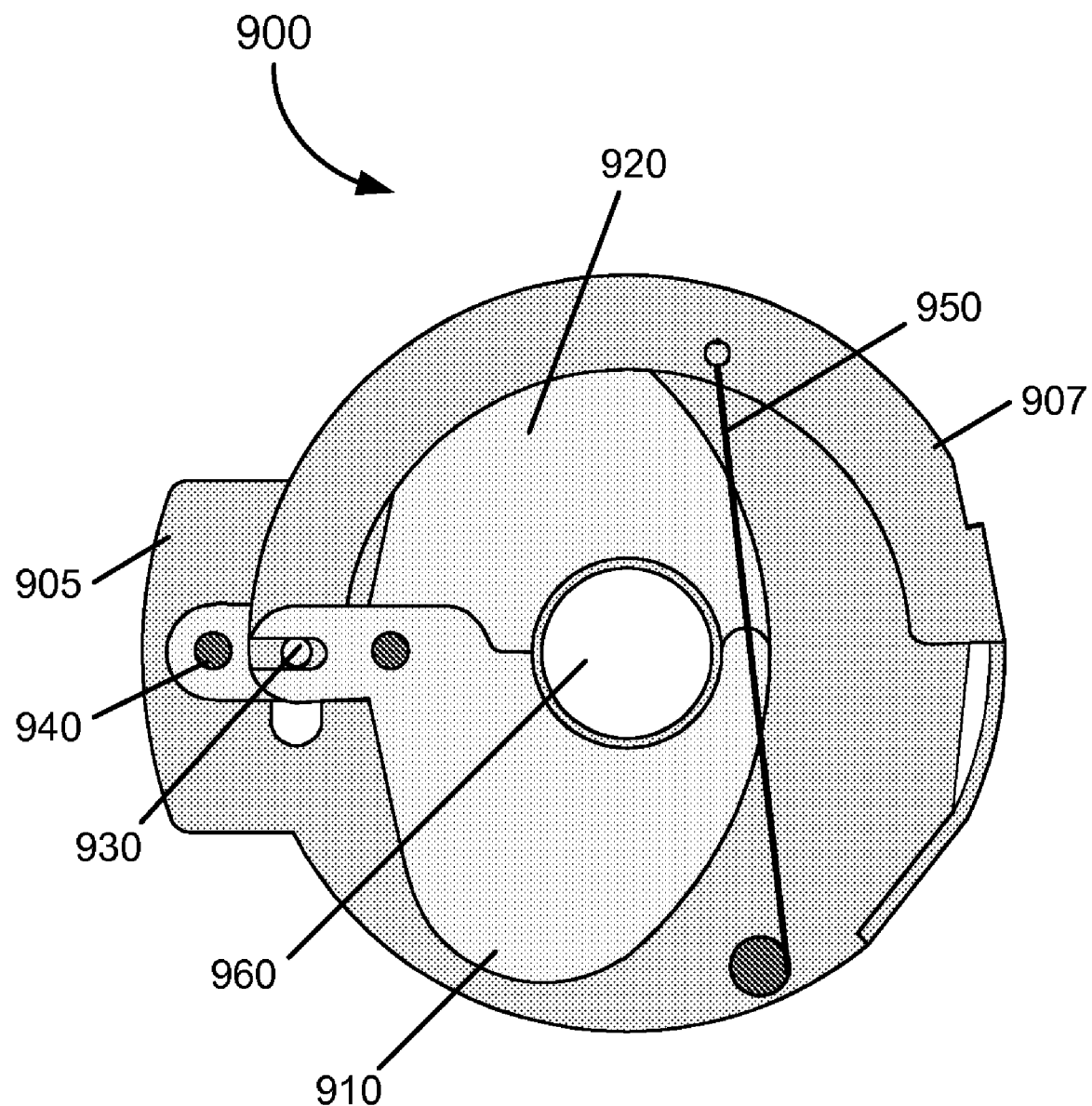
FIG. 9 illustrates a dual shutter blade implementation consistent with principles of the invention.

FIG. 9 illustrates a dual shutter blade implementation. Dual shutter blade 900 may include shutter blades arranged to provide optically symmetric closing when the shutter blades are moved to a closed position. Dual shutter blade assembly 900 may include base plate 905, flexible arm 907, first shutter blade 910, second shutter blade 920, displacement post 930, and pivot location 940, and wire 950. Base plate 905 may be similar to base plate 400 and may support first shutter blade 910 and second shutter blade 920 and may include an opening 960 to allow light to pass therethrough. Flexible arm 907 may be similar to flexible arm 410. First shutter blade 910 and second shutter blade 920 may be similar to shutter blade 500 and may pivot with respect to base plate 905.

Displacement post 930 may include a structure to engage a channel in first shutter blade 910 so as to cause first shutter blade 910 to pivot when flexible arm 907 is displaced via wire 950. Pivot location 940 may include a location on base plate 905 about which first shutter blade 910 or second shutter blade 920 can pivot. Wire 950 may be similar to wire 620 (FIG. 6).

Exemplary Bistable Implementation

Figure 10A:
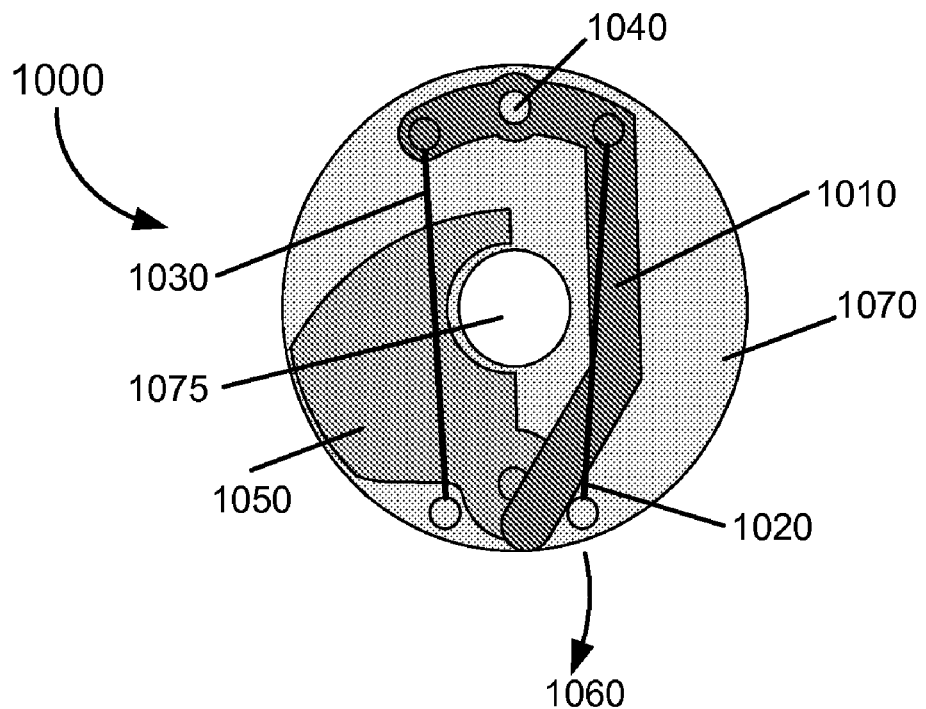
FIGS. 10A and 10B illustrate aspects of a bistable implementation consistent with principles of the invention.
Figure 10B:
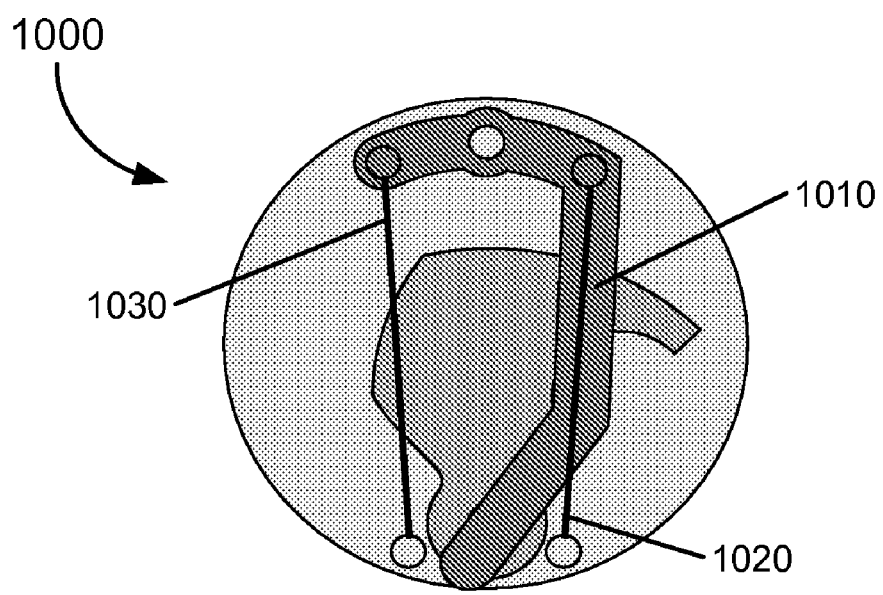

FIGS. 10A and 10B illustrate aspects of a bistable implementation. Bistable assembly 1000 may operate as an iris that can be opened/closed various amounts to allow determined amounts of light to pass through an opening 1075 in a base plate. For example, an iris may be closed to a position that provides for 50% light transmission with respect to light transmission when the iris is in a fully open position. The iris may be maintained at the 50% transmittance position by maintaining a predetermined current to wires manipulating an iris blade.

Bistable assembly 1000 may include a bistable arm 1010, a first wire 1020, a second wire 1030, a mounting post 1040, an iris blade 1050, a base plate 1070, and an opening 1075. Bistable assembly 1000 may employ two wires to pull bistable arm 1010 in a first direction to move iris blade 1050 into a closed position and to pull iris blade 1050 in a second direction to move iris blade 1050 into an open position.

Bistable arm 1010 may include a device that is moveably coupled to a portion of iris blade 1050 and can be displaced from a first position to a second position by a first wire and can be displaced from the second position to the first position by a second wire. Bistable arm 1010 may be displaced in direction 1060 when first wire 1020 contracts. Displacing bistable arm 1010 in direction 1060 may move iris blade 1050 into a closed position. FIG. 10B shows iris blade 1050 in a fully closed position. Bistable arm 1010 may return iris blade 1050 to the open position when first wire 1020 relaxes and second wire 1030 is contracted.

Returning to FIG. 10A, first wire 1020 and second wire 1030 may be similar to wire 620 and may be configured to allow iris blade 1050 to be moved from an open position (i.e., not obstructing opening 1075 in base plate 1070), to substantially any number of intermediate positions (i.e., where a determined amount of light passes through a partially obstructed opening 1075), and to a closed position (i.e., where substantially no light passes through a fully obstructed opening 1075).

Mounting post 1040 may include a device to support bistable arm 1010 on a surface of base plate 1070. Mounting post 1040 may further allow bistable arm 1010 to pivot with respect to base plate 1070 when first wire 1020 or second wire 1030 contract. Iris blade 1050 may be similar to shutter blade 500, and base plate 1070/opening 1075 may be similar to base plate 400/opening 460.

Exemplary Iris Implementation

Figure 11:
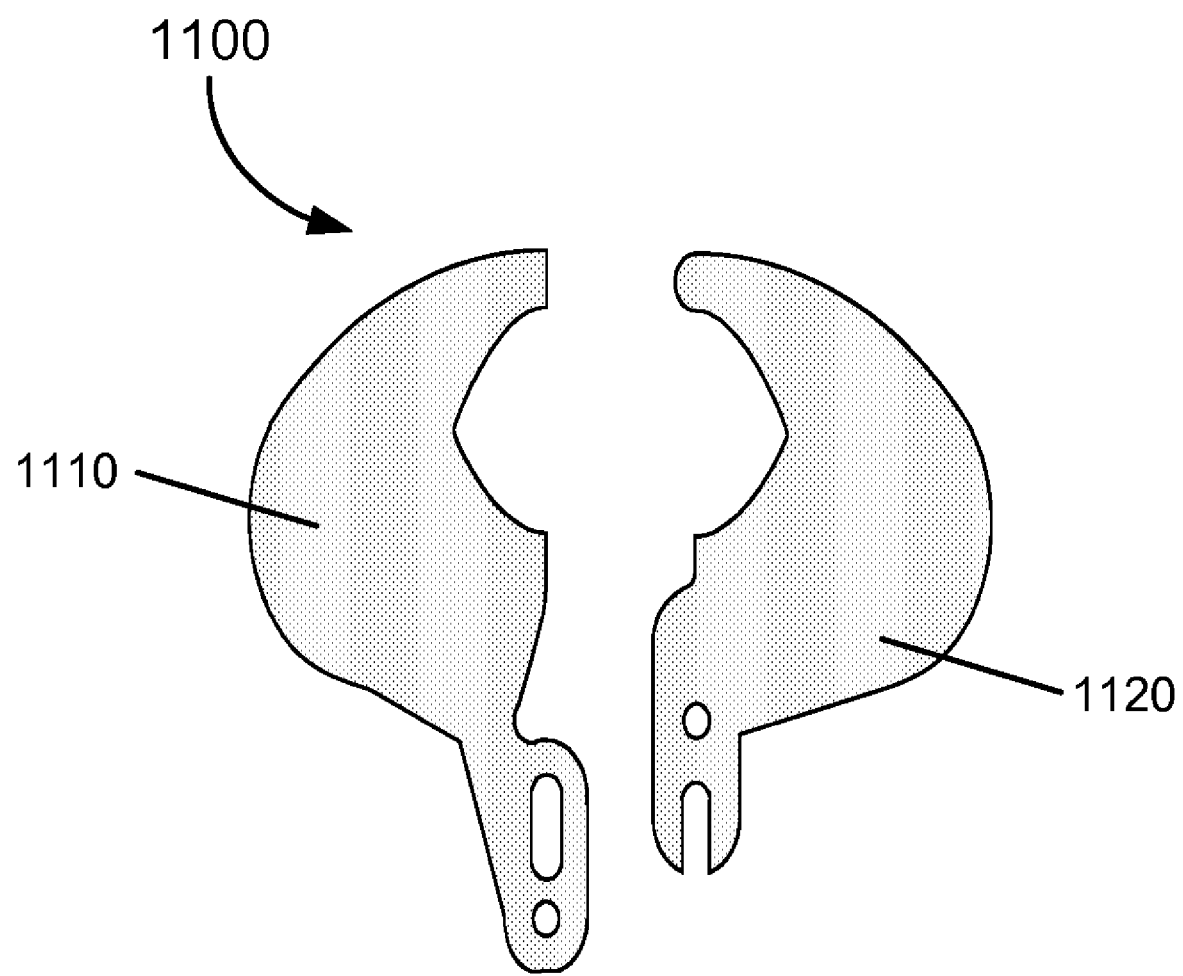
FIG. 11 illustrates a pair of shutter blades that can be used as an iris consistent with principles of the invention.

FIG. 11 illustrates a pair of iris blades that can be used in an iris. Iris assembly 1100 may include a first iris blade 1110 and a second iris blade 1120. First and second iris blades 1110/1120 may be similar to shutter blades 500, 910 or 920 and/or iris blade 1050. First and second iris blades 1110 and 1120 may be sized and shaped to cooperatively restrict or expand a size of an opening associated with a lens assembly, such as lens assembly 120. First and second iris blades 1110 and 1120 may be arranged to provide optically symmetric closing with respect to an opening in a base plate used with the lens assembly.

Figure 12A:
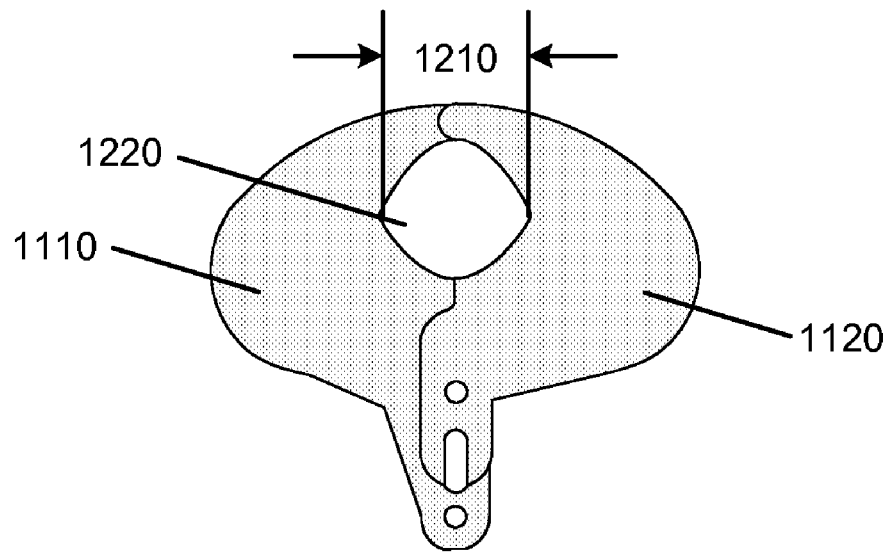
FIGS. 12A and 12B illustrate a dual bladed iris consistent with principles of the invention.
Figure 12B:
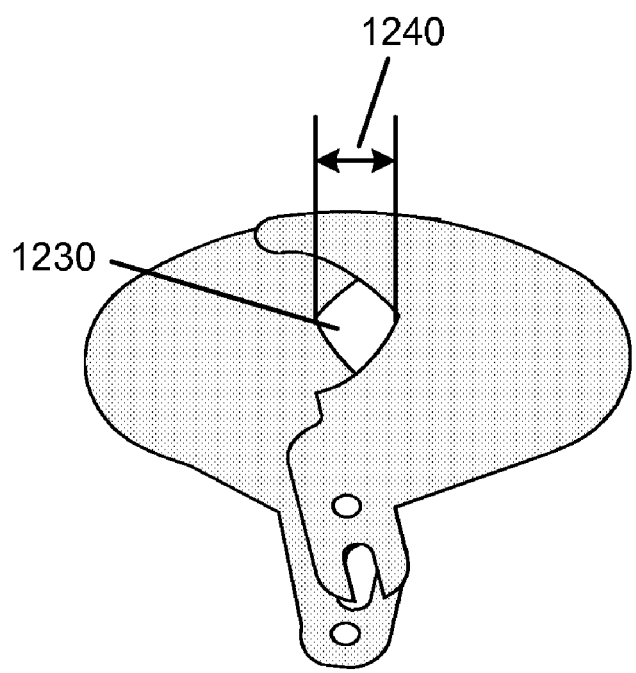

FIGS. 12A and 12B illustrate a dual bladed iris. First iris blade 1110 and second iris blade 1120 may be in a first relationship as shown in FIG. 12A, where the first relationship provides an opening 1220 having a width 1210. Opening 1220 may be sized to allow a determined amount of light to reach image sensor 350 in a determined interval.

FIG. 12B illustrates first iris blade 1110 and second iris blade 1120 in a second relationship that produces an opening 1230 having a second width 1240 that is smaller than first width 1210.

Exemplary Iris Processing

Figure 13:
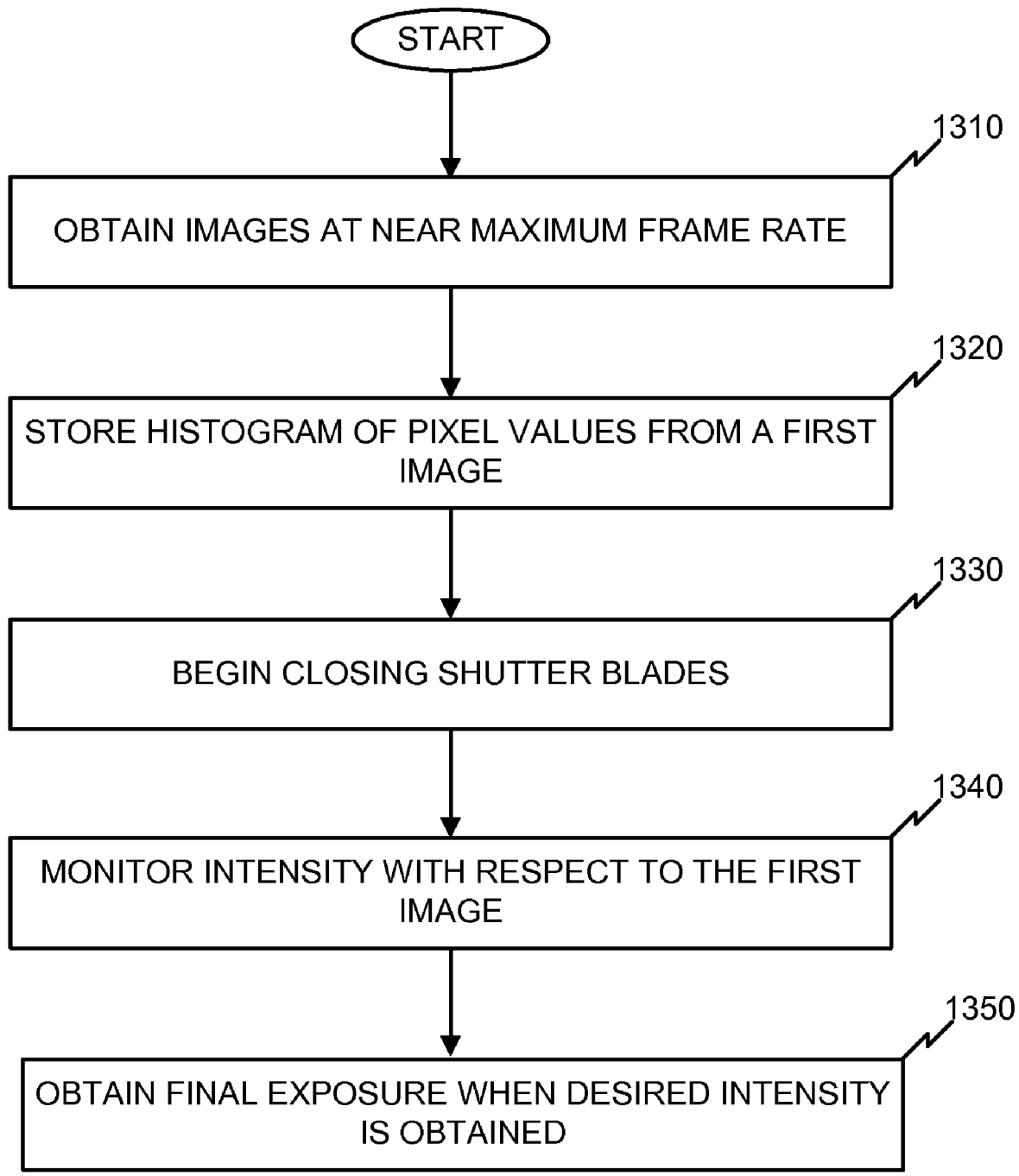
FIG. 13 illustrates exemplary processing to determine a setting for an iris consistent with principles of the invention.

FIG. 13 illustrates exemplary processing to determine a setting for an iris. The processing of FIG. 13 may be used in autofocus implementations and in other implementations of camera 250. Camera 250 may be set to obtain images at a rate close to a maximum frame rate for camera 250 (block 1310). For example, in one implementation, camera 250 may be set to capture images at a rate of approximately 15 frames per second. A histogram of pixel values from a first image may be stored (block 1320). For example, camera 250 may determine that one of the captured images should be used as a reference image. Camera 250 may create and may store histograms for pixel values making up the reference image.

Camera 250 may begin closing first shutter blade 1110 and second shutter blade 1120 (block 1330). For example, camera 250 may instruct power supply 270 to provide PWM current waveforms adapted to cause inner surfaces of first shutter blade 1110 and second shutter blade 1120 to move toward each other. First shutter blade 1110 and second shutter blade 1120 may be moving in a closing direction when the inner surfaces are approaching each other.

Camera 250 may monitor the intensity of incoming light with respect to the first image (reference image) as first shutter blade 1110 and second shutter blade 1120 close (block 1340). For example, camera 250 may compute histograms across pixels at different intervals that are determined by a relative movement of first shutter blade 1110 with respect to second shutter blade 1120.

Camera 250 may obtain a final exposure setting when a desired intensity is obtained (block 1350). In one implementation, camera 250 may adjust an exposure time (i.e., a time interval when first shutter blade 1110 and second shutter blade 1120 are open) to match an aperture size. Camera 250 may store an image when the final exposure setting is reached. First shutter blade 1110 and second shutter blade 1120 may operate with high speeds satisfactory for most photographic applications when manipulated via shape alloy based wires.

Exemplary Processing

Figure 14:
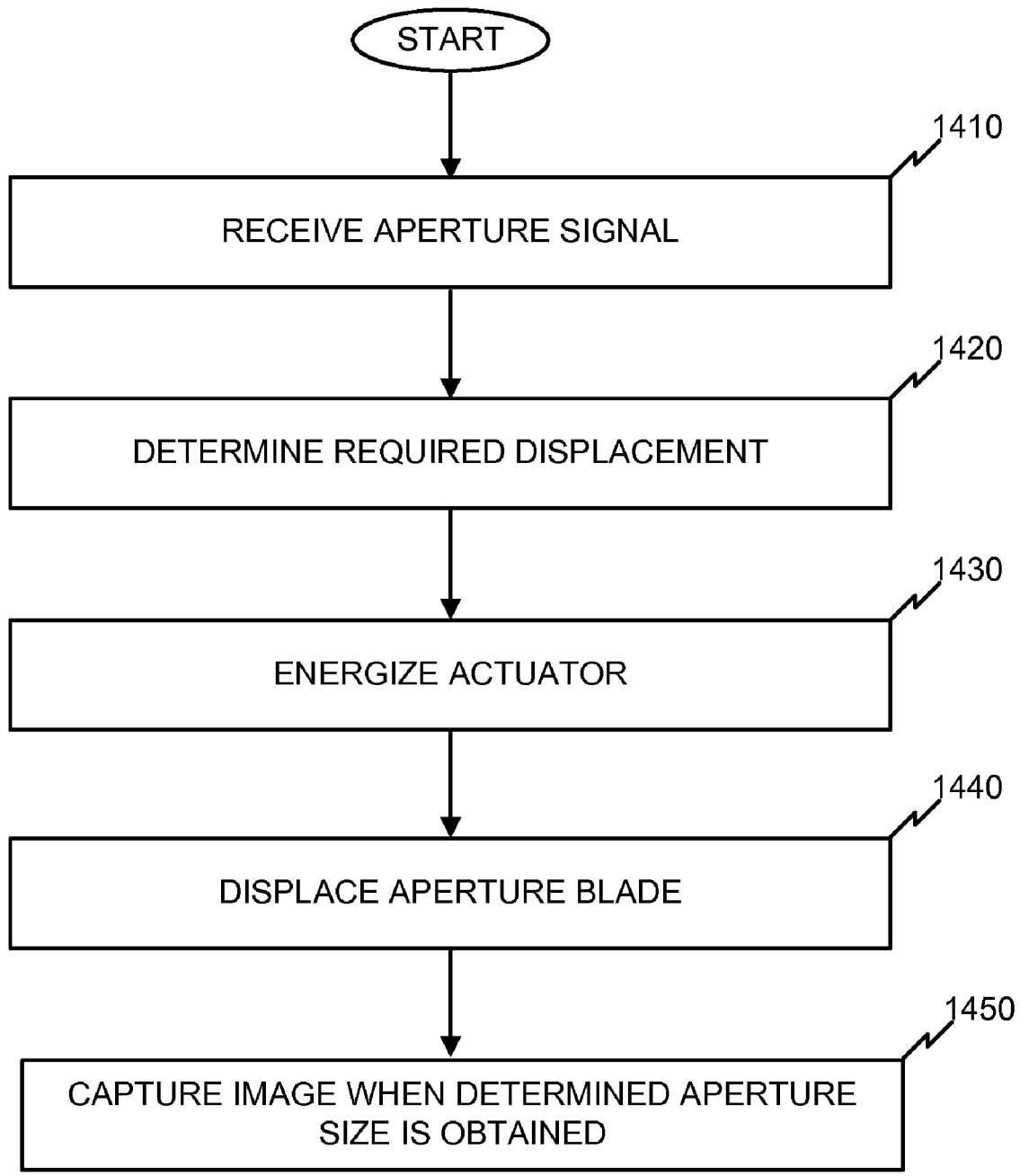
FIG. 14 illustrates exemplary processing to control a shutter consistent with principles of the invention.

FIG. 14 illustrates exemplary processing to control a shutter. Implementations may use a lens assembly 120 that includes a aperture assembly 340, 900, or 1000 located in an aperture plane of lenses 310. Aperture assembly 340, 900, 1000 may be light weight so that aperture assembly 340, 900, 1000 may move with lenses 310 and/or lens barrel 320, such as when manual and/or autofocus operations are performed by camera 250. Aperture assembly 340, 900, 1000 may have a thickness (height) and diameter that allow it to reside within an inner dimension of lens barrel 320 and between two lenses supported by lens barrel 320.

Processing logic 210 may receive an aperture signal from camera 250 (block 1410). The aperture signal may identify an aperture size that will provide good results when that aperture size is used to capture an image. Processing logic 210 may determine the shutter displacement required to obtain the desired aperture size (block 1420). For example, processing logic 210 may determine that a monostable implementation (e.g., FIGS. 6 and 7) may require that shutter blade 500 be displaced on the order of 2 mm. Processing logic 210 may determine that shutter blades used in a bistable implementation can be move on the order of 1 mm, respectively, to obtain the desired aperture size.

Processing logic 210 may energize actuator 260 (block 1430). In one implementation, actuator 260 may include one or more muscle wires adapted to displace a shutter blade in a determined direction at a determined speed. Processing logic 210 may instruct power supply 270 to energize actuator 260 via a PWM current waveform, where the PWM current waveform is adapted to heat the muscle wire to a temperature just below a threshold temperature that causes the muscle wire to contract (e.g., preconditioning pulses 870).

Power supply 270 may cause shutter blade 500 to be displaced a determined distance (block 1440). For example, power supply 270 may apply sufficient current, such as by applying a PWM current waveform, to wire 620 so as to cause wire 620 to contract a determine amount. In one implementation, power supply 270 may apply closing pulse 880 (FIG. 8) to cause wire 620 to change from length 670 (FIG. 6) to length 710 (FIG. 7). Shutter blade 500 may move from a first (open) position to a second (closed) position when wire 620 contracts. Power supply 270 may operate with shutter blade 500 to provide a global shutter capability to camera 250, where the global shutter capability allows substantially an entire imaging area (e.g., an imaging area of image sensor 350) to be opened or closed, with respect to incoming light, at substantially the same time.

Camera 250 may capture an image when the determined aperture size is obtained (block 1450). For example, camera 250 may receive an instruction from processing logic 210 to capture an image when the determined aperture size is obtained. In another implementation, camera 250 may sense an amount of light hitting image sensor 350 and may capture an image when the amount of light is within a determined range. Camera 250 may reset pixels making up image sensor 350 when an exposure starts once a determined aperture size is achieved. Shutter blades may move a high speeds when manipulated via shape alloy based wires, such as wire 620. Implementations, may control shutter blade speeds to allow for the use of a variety of shutter speed settings with camera 250, such as $1/500^{th}$, $1/100^{th}$, $1/25^{th}$, $1/10^{th}$, etc. fractions of a second.

CONCLUSION

Implementations consistent with principles of the invention may facilitate obtaining sharp images via digital image capturing devices.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIGS. 13 and 14, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit, a field programmable gate array, a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
    a shutter blade to occlude an opening to a sensor;
    a base plate to:
        support an arm,
        support a wire having a proximal end and a distal end, where the distal end is coupled to the arm and the proximal end is coupled to a post, where a current is applied, via the post and to the wire, to modify a temperature of the wire, and where the wire displaces the arm when the current increases the temperature of the wire above a threshold temperature, and
        pivotally support the shutter blade via a pivot location, where the shutter blade moves pivotally around the pivot location to occlude the opening in response to the arm being displaced by the wire;
    a processor to:
        generate a pulse width modulated waveform comprising a preconditioning pulse, a closing pulse, and a maintenance pulse, where the preconditioning pulse maintains the wire substantially at a particular temperature below the threshold temperature, the closing pulse raises the temperature of the wire above the threshold temperature, and the maintenance pulse maintains the temperature of the wire above the threshold temperature; and
    an output interface to:
        provide, to the wire and based on an instruction to operate the shutter blade, the preconditioning pulse, the closing pulse, and the maintenance pulse, where the instruction is related to recording an image via the sensor when shutter blade does not occlude the opening.

2. The device of claim 1, comprising:
a displacement post coupled to the arm and to a first end of the shutter blade, where the arm, when displaced by the wire, displaces the first end of the shutter blade to cause a second end of the shutter blade to pivot about the pivot location to cause the shutter blade to move from the first position to the second position.

3. The device of claim 2,
where the shutter blade is a first shutter blade,
where the arm, when displaced by the wire, causes the first shutter blade to pivot about the pivot location in a first rotational direction, and
where the device further comprises:
a second shutter blade coupled to the arm, where the arm, when displaced by the wire, causes the second shutter blade to pivot about the pivot location in a second rotational direction, where the second rotational direction is opposite to the first rotational direction.

4. The device of claim 1, where the threshold temperature is about 70 degrees centigrade.

5. The device of claim 4, where the maintenance pulse maintains the temperature of the wire in a range of about 70 degrees centigrade to about 98 degrees centigrade.

6. The device of claim 1, where the base plate is coupled to an electrical ground.

7. The device of claim 1, where the shutter blade operates as an iris with respect to the opening.

8. The device of claim 1, where the device is used in a lens assembly of a digital camera.

9. The device of claim 8, where the digital camera is implemented in a portion of a mobile communication terminal.

10. A mobile terminal, comprising:
means for focusing on a subject image with respect to an image sensor using a lens assembly;
means for admitting light associated with the subject image to the image sensor through the lens assembly, where the admitting means is supported inside a lens barrel associated with the lens assembly;
means for determining a shutter speed to record the subject image via the image sensor;
means for moving a shutter blade, via a wire, from an open position to a closed position using a pulse width modulated current waveform, where the shutter blade prevents the light associated with the subject image from reaching the image sensor when the shutter is in the closed position, where the shutter blade is in the closed position when a temperature of the wire is raised above a threshold temperature, and where the pulse width modulated current waveform comprises a preconditioning pulse to maintain the wire at about a particular temperature below the threshold temperature, a closing pulse to raise the temperature of the wire above the threshold temperature, and a maintenance pulse to maintain the temperature of the wire above the threshold temperature; and
means for returning the shutter to the open position when the image is recorded.

11. A method implemented in a camera device, the method comprising:
receiving, via the camera device, optical information from a subject, where the camera device comprises a shutter assembly that includes a shutter blade that moves to expose an optical sensor and a wire to move the shutter blade when a temperature of the wire is above a threshold;
providing, via the camera device and to the wire, a pulse width modulated waveform comprising preconditioning pulses to maintain the wire at about a particular temperature below the threshold, a closing pulse to raise the temperature of the wire above the threshold, and maintenance pulses to maintain the temperature of the wire above the threshold, where the wire moves the shutter blade in response to receiving the pulse width modulated waveform; and
recording, via the sensor and in response to providing the pulse width modulated waveform, the optical information passing through the shutter assembly.

12. The method of claim 11, where the threshold temperature is about 70 degrees centigrade.

13. The method of claim 11, where the maintenance pulse maintains the temperature of the wire in a range of about 70 degrees centigrade to about 98 degrees centigrade.

14. The method of claim 11, where:
the shutter blade is a first shutter blade,
the shuttle assembly includes a second shuttle blade, and
the wire moves the first shutter blade in a first rotational direction and moves the second shutter blade in a second rotational direction to expose the optical sensor, the first rotational direction being opposite to the second rotational direction.

15. The method of claim 11, where the shutter blade operates as an iris with respect to the optical sensor.

16. The method of claim 11, where the camera device is a mobile communication terminal.

* * * * *